(12) United States Patent
Liu et al.

(10) Patent No.: US 10,089,849 B2
(45) Date of Patent: Oct. 2, 2018

(54) WIRELESS MESH NETWORK GAS DETECTION REAL TIME LOCATION SYSTEM

(71) Applicants: HONEYWELL INTERNATIONAL INC., Morristown, NJ (US); James Liu, Morristown, NJ (US); Peter Hsi, Morristown, NJ (US); Pengjun Zhao, Morristown, NJ (US); Kai Ren, Morristown, NJ (US); Xiaoxiong Li, Morristown, NJ (US)

(72) Inventors: James Liu, Livermore, CA (US); Peter Hsi, Dublin, CA (US); Pengjun Zhao, Shanghai (CN); Kai Ren, Shanghai (CN); Xiaoxiong Li, Shanghai (CN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/557,766

(22) PCT Filed: Mar. 12, 2015

(86) PCT No.: PCT/CN2015/074089
§ 371 (c)(1),
(2) Date: Sep. 12, 2017

(87) PCT Pub. No.: WO2016/141582
PCT Pub. Date: Sep. 15, 2016

(65) Prior Publication Data
US 2018/0075728 A1    Mar. 15, 2018

(51) Int. Cl.
*G08B 17/10*    (2006.01)
*G08B 21/14*    (2006.01)
(Continued)

(52) U.S. Cl.
CPC .......... *G08B 21/14* (2013.01); *H04W 64/003* (2013.01); *H04W 84/18* (2013.01)

(58) Field of Classification Search
CPC ..... G08B 21/14; H04W 64/003; H04W 84/18
See application file for complete search history.

(56) References Cited

U.S. PATENT DOCUMENTS 5,060,308 A * 10/1991 Bieback ................ H04B 10/00
                                                    128/201.19
5,568,121 A * 10/1996 Lamensdorf ......... G08B 25/016
                                                    340/502
(Continued)

FOREIGN PATENT DOCUMENTS

AU    2015385701 A1    10/2017
BR    PI1105634 A2    7/2015
(Continued)

OTHER PUBLICATIONS

Europe Patent Application No. 11191449, Decision to Grant, mailed Sep. 29, 2016, 2 pages.
(Continued)

*Primary Examiner* — Joseph Feild
*Assistant Examiner* — Rufus Point
(74) *Attorney, Agent, or Firm* — Wick Phillips Gould & Martin, LLP

(57) ABSTRACT

Embodiments of the disclosure relate to systems and methods for isolating a base station beacon and gas reading transmission channel(s) based on a single radio wireless gas detection system. A gas detector may communicate on a first channel (e.g. a beacon channel) constantly listening to the base station beacon information. At a pre-defined interval (e.g. every 60 seconds), the gas detector radio may switch to a second channel (e.g. a data channel) to transmit gas reading data as well as the base station information to a central server. Software on the server may complete a
(Continued)

triangulation algorithm to determine the location of the gas detector, using information obtained by the detector from the beacons.

20 Claims, 1 Drawing Sheet

(51) Int. Cl.
*H04W 64/00* (2009.01)
*H04W 84/18* (2009.01)

(56) References Cited

U.S. PATENT DOCUMENTS

| | | | | |
|---|---|---|---|---|
| 5,767,390 A * | 6/1998 | Chapman, IV | ....... | G01M 3/226 73/40.7 |
| 5,771,004 A * | 6/1998 | Suppelsa | ............ | G01N 33/0062 340/521 |
| 5,922,943 A | 7/1999 | Chapman, IV | | |
| 6,053,030 A * | 4/2000 | Whynall | ............ | G01N 33/0009 340/632 |
| 6,114,964 A * | 9/2000 | Fasano | ................ | G01N 33/0075 340/628 |
| 6,138,512 A * | 10/2000 | Roberts | ................ | G01M 3/243 73/40 |
| 6,182,497 B1 * | 2/2001 | Krajci | ................ | G01N 33/0075 340/605 |
| 6,198,390 B1 * | 3/2001 | Schlager | ............... | B63C 9/0005 340/539.1 |
| 6,252,510 B1 * | 6/2001 | Dungan | ................ | G01N 33/0075 340/539.1 |
| 6,415,646 B1 * | 7/2002 | Kessel | ............... | G01N 33/0075 340/632 |
| 6,670,887 B2 | 12/2003 | Dungan | | |
| 6,772,071 B2 * | 8/2004 | Gilbert | ............... | G01N 33/0004 702/23 |
| 6,885,299 B2 * | 4/2005 | Cooper | ................. | G08B 21/10 244/159.3 |
| 7,019,637 B1 * | 3/2006 | Johnson | ................ | G08B 21/12 340/506 |
| 7,080,544 B2 * | 7/2006 | Stepanik | ................ | G08B 21/12 702/22 |
| 7,091,852 B2 * | 8/2006 | Mason | ................ | G01C 21/206 340/539.13 |
| 7,191,097 B1 * | 3/2007 | Lee | ........................ | G06Q 10/06 340/524 |
| 7,221,928 B2 * | 5/2007 | Laird | ........................ | A61B 5/04 455/404.1 |
| 7,292,189 B2 * | 11/2007 | Orr | ........................ | G01S 5/0215 342/387 |
| 7,345,582 B2 * | 3/2008 | Gould | ..................... | G01S 5/166 340/539.26 |
| 7,483,917 B2 * | 1/2009 | Sullivan | ................ | G06T 17/05 |
| 7,522,043 B2 * | 4/2009 | English | ................ | G06Q 10/08 340/431 |
| 7,528,711 B2 * | 5/2009 | Kates | ................... | G08B 25/005 340/10.1 |
| 7,605,696 B2 * | 10/2009 | Quatro | ................... | G06Q 10/08 340/539.13 |
| 7,609,159 B2 * | 10/2009 | Benson | ............... | G05B 13/0275 340/539.13 |
| 7,688,198 B2 | 3/2010 | Amidi | | |
| 7,848,732 B2 * | 12/2010 | Thomas | ............. | G01N 33/0075 455/404.1 |
| 7,874,198 B2 * | 1/2011 | Groves | ................ | G01N 1/2273 73/31.01 |
| 7,904,244 B2 * | 3/2011 | Sugla | ..................... | G01C 21/00 342/451 |
| 7,934,412 B2 | 5/2011 | Prince | | |
| 7,994,926 B2 * | 8/2011 | Longman | .................. | G01T 7/00 250/336.1 |
| 8,099,130 B1 * | 1/2012 | Halla | ..................... | G08B 21/12 340/539.22 |
| 8,350,693 B2 * | 1/2013 | McSheffrey, Sr. | ........ | A61N 1/39 340/286.05 |
| 8,400,317 B2 | 3/2013 | Johnson, Jr. et al. | | |
| 8,442,801 B2 | 5/2013 | Gonla et al. | | |
| 8,499,317 B2 * | 7/2013 | Lee | ..................... | H04N 21/4751 725/25 |
| 8,560,645 B2 * | 10/2013 | Linden | ................. | H04L 41/0806 370/310.2 |
| 8,885,559 B2 * | 11/2014 | Schmidt | ................. | G01D 21/00 340/539.13 |
| 9,612,195 B1 * | 4/2017 | Friedman | ........... | G01N 21/3504 |
| 9,936,391 B2 * | 4/2018 | Bhanage | ............ | H04W 16/00 |
| 2002/0008625 A1 * | 1/2002 | Adams | ............... | G08B 21/0211 340/573.1 |
| 2003/0214410 A1 * | 11/2003 | Johnson | .................... | G07C 1/20 340/573.4 |
| 2004/0056771 A1 * | 3/2004 | Dungan | ............. | G01N 33/0075 340/632 |
| 2004/0149918 A1 * | 8/2004 | Craig | ........................ | G01J 1/00 250/370.01 |
| 2004/0203904 A1 * | 10/2004 | Gwon | ................... | G01S 5/0252 455/456.1 |
| 2004/0204915 A1 * | 10/2004 | Steinthal | ................ | B82Y 30/00 702/188 |
| 2004/0215532 A1 * | 10/2004 | Boman | ................... | G06Q 10/06 705/28 |
| 2005/0057370 A1 * | 3/2005 | Warrior | ............... | H04B 7/18506 340/870.01 |
| 2006/0082462 A1 * | 4/2006 | Crook | .................... | G08B 21/14 340/632 |
| 2007/0008099 A1 * | 1/2007 | Kimmel | ................. | A62C 99/00 340/506 |
| 2007/0010248 A1 * | 1/2007 | Dravida | ................. | H04W 60/00 455/435.1 |
| 2007/0050157 A1 * | 3/2007 | Kahn | ...................... | C02F 1/008 702/55 |
| 2007/0168127 A1 * | 7/2007 | Zaruba | ................... | A61B 5/053 701/500 |
| 2008/0122641 A1 * | 5/2008 | Amidi | .................... | G08B 21/14 340/632 |
| 2008/0130604 A1 * | 6/2008 | Boyd | ....................... | G01S 5/021 370/338 |
| 2008/0168826 A1 * | 7/2008 | Saidi | ........................ | G01M 3/20 73/40 |
| 2009/0005019 A1 * | 1/2009 | Patel | .................... | G08B 27/006 455/414.2 |
| 2009/0139299 A1 * | 6/2009 | Prince | ................... | G01N 33/0057 73/1.06 |
| 2009/0188302 A1 * | 7/2009 | Rolff | ....................... | G01M 3/207 73/40.7 |
| 2009/0212995 A1 * | 8/2009 | Wu | ........................ | G01S 5/0278 342/109 |
| 2010/0081411 A1 * | 4/2010 | Montenero | ........ | G08B 21/0233 455/404.2 |
| 2011/0037599 A1 * | 2/2011 | Johnson, Jr. | .......... | H04W 4/043 340/632 |
| 2011/0090887 A1 * | 4/2011 | Kim | ..................... | H04W 16/14 370/338 |
| 2011/0161044 A1 * | 6/2011 | Gonia | ................... | G01S 5/0289 702/150 |
| 2011/0251800 A1 * | 10/2011 | Wilkins | .................... | G01J 3/02 702/24 |
| 2011/0255487 A1 * | 10/2011 | Jain | ...................... | H04B 7/0695 370/329 |
| 2011/0291882 A1 * | 12/2011 | Walsh | .................... | G01S 19/46 342/357.29 |
| 2011/0312330 A1 * | 12/2011 | Sadek | .................... | H04W 16/14 455/452.2 |
| 2012/0280818 A1 | 11/2012 | Johnson, Jr. et al. | | |
| 2012/0310547 A1 * | 12/2012 | Cristoforo | ............. | G08B 21/14 702/24 |
| 2013/0260792 A1 * | 10/2013 | Johnson, Jr. | ......... | G06K 7/0095 455/456.1 |
| 2013/0328697 A1 * | 12/2013 | Lundy | ..................... | G08C 17/02 340/870.16 |

(56) References Cited

U.S. PATENT DOCUMENTS

| | | | | |
|---|---|---|---|---|
| 2013/0331028 | A1* | 12/2013 | Kuehnel | H04W 76/10 |
| | | | | 455/41.1 |
| 2014/0031802 | A1* | 1/2014 | Melsky | A61B 18/22 |
| | | | | 606/14 |
| 2014/0162692 | A1* | 6/2014 | Li | H04L 67/40 |
| | | | | 455/456.3 |
| 2014/0253326 | A1* | 9/2014 | Cho | H04W 4/90 |
| | | | | 340/539.13 |
| 2014/0254549 | A1* | 9/2014 | Lee | H04W 36/24 |
| | | | | 370/331 |
| 2014/0349707 | A1* | 11/2014 | Bang | H04Q 9/00 |
| | | | | 455/556.1 |
| 2015/0075256 | A1* | 3/2015 | Basham | G01N 33/0016 |
| | | | | 73/31.01 |
| 2015/0177208 | A1* | 6/2015 | Murphy | G01N 33/0063 |
| | | | | 235/375 |
| 2016/0334378 | A1* | 11/2016 | Maddila | G01N 33/0006 |
| 2016/0381440 | A1* | 12/2016 | Davis | H04Q 9/00 |
| | | | | 340/870.02 |
| 2017/0041954 | A1* | 2/2017 | Tsai | H04W 16/14 |

FOREIGN PATENT DOCUMENTS

| | | |
|---|---|---|
| CA | 2760872 A1 | 6/2012 |
| CN | 101361321 A | 2/2009 |
| CN | 101983515 A | 3/2011 |
| CN | 202082628 U | 12/2011 |
| CN | 102937610 A | 2/2013 |
| CN | 102608564 B | 4/2016 |
| CN | 107005806 A | 8/2017 |
| EP | 2339556 A1 | 6/2011 |
| EP | 1929455 B1 | 12/2011 |
| EP | 2461176 B1 | 10/2016 |
| EP | 3228068 | 10/2017 |
| IN | 032013 | 1/2013 |
| JP | 09009339 | 1/1997 |
| JP | 2004242129 A | 8/2004 |
| JP | 2009092594 A | 4/2009 |
| JP | 2010236866 A | 10/2010 |
| JP | 605885 B2 | 1/2017 |
| RU | 46597 U1 | 7/2005 |
| RU | 2602700 C2 | 11/2016 |
| SU | 1621067 A1 | 1/1991 |
| WO | 2005001788 A1 | 1/2005 |
| WO | 2011019525 A1 | 2/2011 |
| WO | 2016089734 A1 | 6/2016 |
| WO | 2016141582 A1 | 9/2016 |
| WO | 2016182878 A1 | 11/2016 |

OTHER PUBLICATIONS

Canada Patent Application No. 2760872, Office Action, dated Apr. 5, 2017, 3 pages.
China Patent Application No. 201110462147.9, Office Action, dated Oct. 30, 2014, 9 pages.
China Patent Application No. 201110462147.9, Office Action, dated Jul. 30, 2015, 4 pages.
China Patent Application No. 201110462147.9, Notification to Grant Patent Right, dated Feb. 5, 2016, 2 pages.
United Arab Emirates Patent Application No. 122112011, Notice of Acceptance, dated May 4, 2017, 2 pages.
International Application No. PCT/US2016/031113, International Preliminary Report on Patentability, dated Nov. 14, 2017, 9 pages.
U.S. Appl. No. 15/532,620, filed Jun. 2, 2017, 19 pages.
Europe Patent Application No. 10193394.3, Examination Report, dated Jun. 30, 2016, 6 pages.
Sierra Monitor Corporation, Sentry 8 Channel Gas Detection Controller Data Sheet, http://www.sierramonitor.com/assets/blt76714116742534fe/SMC%20Data%20Sheet%20-%20Sentry%20Controller.pdf, 2009, 4 pages.
Europe Patent Application No. 10193394.3, Search Report, dated Apr. 5, 2011, 3 pages.
U.S. Appl. No. 12/695,736, Office Action, dated Jun. 7, 2013, 16 pages.
U.S. Appl. No. 12/695,736, Final Office Action, dated Oct. 11, 2013, 16 pages.
U.S. Appl. No. 12/695,736, Office Action, dated Jan. 30, 2014, 19 pages.
U.S. Appl. No. 12/695,736, Final Office Action, dated Aug. 19, 2014, 21 pages.
U.S. Appl. No. 12/695,736, Office Action, dated Mar. 2, 2015, 27 pages.
U.S. Appl. No. 12/695,736, Final Office Action, dated Jun. 10, 2015, 36 pages.
U.S. Appl. No. 12/695,736, Advisory Action, dated Nov. 7, 2014, 7 pages.
U.S. Appl. No. 12/695,736, Advisory Action, dated Aug. 11, 2015, 3 pages.
U.S. Appl. No. 12/695,736, Examiner's Answer to Appeal Brief, dated Mar. 22, 2016, 34 pages.
U.S. Appl. No. 12/695,736, Examiner's 2nd or Subsequent Answer to Appeal Brief, dated Apr. 8, 2016, 34 pages.
Europe Patent Application No. 10193394.3, Examination Report, dated Apr. 21, 2011, 3 pages.
Europe Patent Application No. 10193394.3, Summons to Attend Oral Hearings, mailed Dec. 8, 2016, 8 pages.
International Application No. PCT/US2015/062916, International Search Report, dated Feb. 29, 2016, 3 pages.
International Application No. PCT/US2015/062916, Written Opinion of the International Searching Authority, dated Feb. 29, 2016, 7 pages.
International Application No. PCT/CN2015/074089, International Search Report, dated Oct. 28, 2015, 3 pages.
International Application No. PCT/CN2015/074089, Written Opinion of the International Searching Authority, dated Oct. 28, 2015, 4 pages.
International Application No. PCT/US2016/031113, International Search Report, dated Nov. 7, 2016, 5 pages.
International Application No. PCT/US2016/031113, Written Opinion of the International Searching Authority, dated Nov. 7, 2016, 8 pages.
True Wireless TM Gas Transmitters, 2008, Retrieved from the Internet:<www.gastronics.com>, 2 pages.
Neotronics Safe-T-Cube, 2005, Retrieved from the Internet on Apr. 5, 2017; Retrieved from the Internet: <http://www.abstrumenti.com/datasheet/safe-t-cube.pdf>., 4 pages.
Safe-T-Cube, Retrieved from the Internet on: Sep. 19, 2009; Retrieved from the Internet: <http://nutech-australia.com.au/nutech-australia.com.au/Neotronics>, 1 page.
U.S. Appl. No. 14/730,794, Restriction Requirement, dated Jan. 23, 2017, 9 pages.
U.S. Appl. No. 14/730,794, Office Action, dated Apr. 18, 2017, 18 pages.
Europe Patent Application No. 10193394.3, Brief Communication, dated May 3, 2017, 7 pages.
Europe Patent Application No. 10193394.3, Examination Report, dated May 3, 2017, 7 pages.
Europe Patent Application No. 10193394.3, Decision to Refuse, mailed Jul. 20, 2017, 33 pages.
U.S. Appl. No. 14/730,794, Final Office Action, dated Aug. 30, 2017, 12 pages.
International Application No. PCT/CN2015/074089, International Preliminary Report on Patentability, dated Sep. 12, 2017, 5 pages.
International Application No. PCT/US2015/062916, International Preliminary Report on Patentability, dated Jun. 6, 2017, 8 pages.
Europe Patent Application No. 15816952.4, Communication Pursuant to Rules 161(1) and 162 EPC, dated Jul. 11, 2017, 2 pages.
International Application No. PCT/US2015/031113, International Search Report, dated Jul. 11, 2016, 5 pages.
International Application No. PCT/US2015/031113, Written Opinion of the International Searching Authority, dated Jul. 11, 2016, 8 pages.
Europe Patent Application No. 11191449, European Search Report, dated May 8, 2012, 4 pages.

(56) References Cited

OTHER PUBLICATIONS

Junjie Chen et al., "A Weighted Compensated Localization Algorithm of Nodes in Wireless Sensor Networks", Advanced Computational Intelligence, Aug. 25-28, 2010, Zushou, Juiangsu, China, pp. 379-384.
Elisabetta Farella et al.,"Aware and smart environments: The Casanetta project", Microelectronics Journal 41 (2010), pp. 697-702.
U.S. Appl. No. 12/959,250, Office Action, dated Oct. 4, 2012, 40 pages.
U.S. Appl. No. 12/959,250, Notice of Allowance, dated Jan. 18, 2013, 12 pages.
Russia Patent Application No. 2011149131, Office Action, dated Sep. 23, 2015, 12 pages.
Russia Patent Application No. 2011149131, Office Action, dated Feb. 19, 2016, 14 pages.
Russia Patent Application No. 2011149131, Notice of Allowance, dated Jun. 14, 2016, 23 pages.
Japan Patent Application No. 2011-263814, Office Action, dated Aug. 4, 2015, 10 pages.
Japan Patent Application No. 2011-263814, Office Action, dated Apr. 12, 2016, 7 pages.
Japan Patent Application No. 2011-263814, Notice of Allowance, dated Nov. 9, 2016, 6 pages.
Europe Patent Application No. 11191449, Examination Report, dated May 21, 2012, 8 pages.
Europe Patent Application No. 11191449, Examination Report, dated May 5, 2015, 4 pages.
Europe Patent Application No. 11191449, Intention to Grant, dated Jun. 23, 2016, 19 pages.
U.S. Appl. No. 12/695,736, Examiner's 2nd or Subsequent Answer to Appeal Brief, mailed Apr. 8, 2016, 34 pages.
U.S. Appl. No. 12/695,736, Decision on Appeal, mailed Aug. 1, 2017, 8 pages.

\* cited by examiner

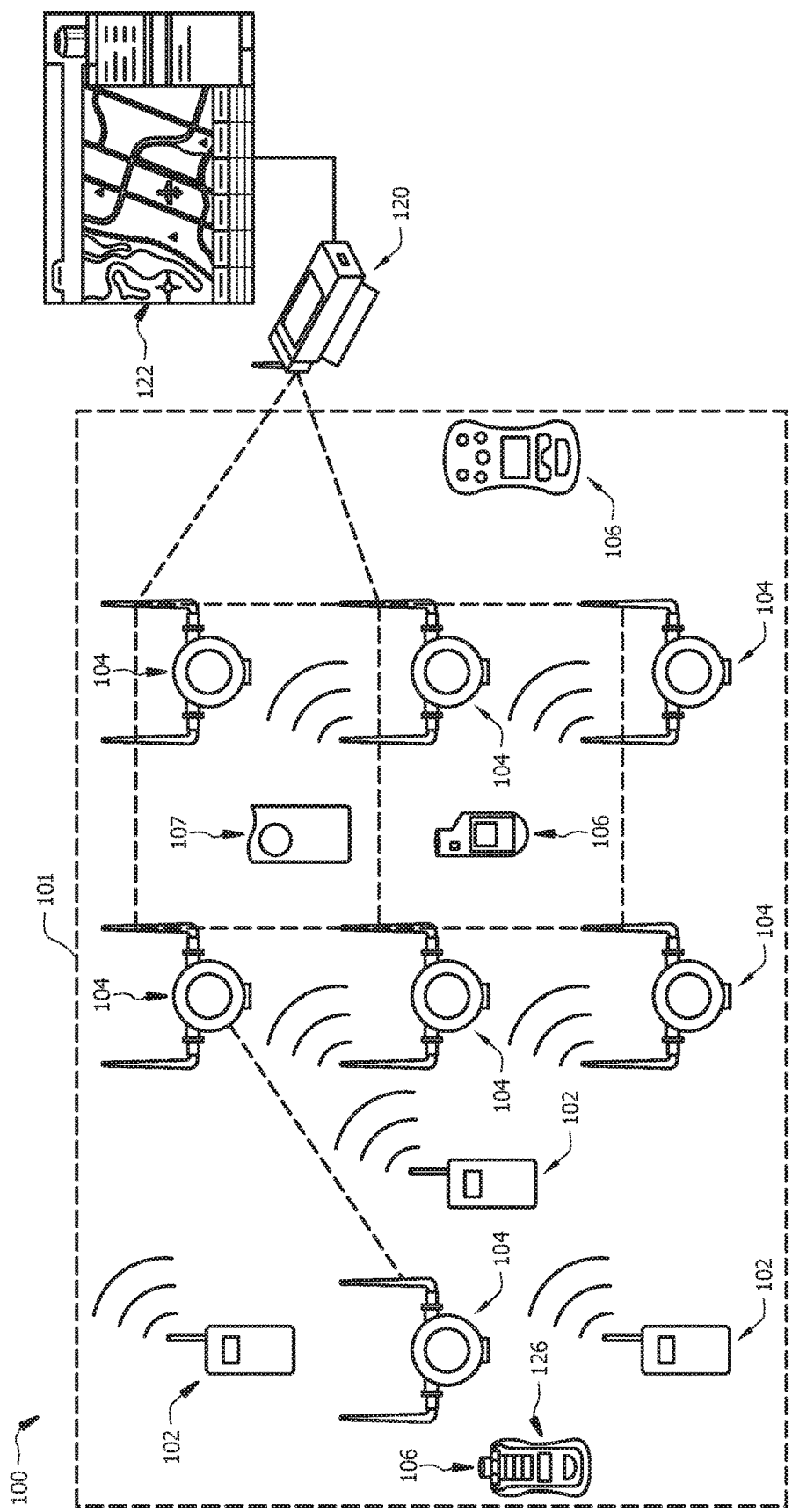

WIRELESS MESH NETWORK GAS DETECTION REAL TIME LOCATION SYSTEM

CROSS-REFERENCE TO RELATED APPLICATIONS

The present application claims priority to and is the National Stage of International Application No. PCT/CN2015/074089 (entitled "WIRELESS MESH NETWORK GAS DETECTION REAL TIME LOCATION SYSTEM", filed Mar. 12, 2015) which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a safety related wireless gas detection environment, tracking a worker in a facility is very critical and also very challenging. Global positioning systems (GPS) are widely used for location purpose but may not be ideal for the oil and gas industry. Triangulation location algorithms are widely used in such environments. Three parameters are used in triangulation, received signal strength indication (RSSI), time difference of arrival (TDOA) and angle of arrival (AoA). To acquire the location information using a triangulation method, base stations may be programmed to act as access points, location anchors, or beacon cells, wherein these devices may be installed in known locations. The base stations may periodically transmit wireless beacon information. A gas detector within the base station proximity would receive base station identification (ID) information and send this information to the server for location calculation.

For a system using a single radio based gas detector, a challenge may arise when the base station beacon and the transmission of the gas detection data are accomplished using the same radio frequency channel. A traffic jam may easily occur when the network size is very large. Furthermore, increased location accuracy requires a higher density of base stations, which may cause the traffic to be even higher. When the traffic is very high, the gas detection wireless network may become unstable and prone to failure.

SUMMARY

Aspects of the disclosure may include embodiments of a communication system for use in a facility comprising hazardous or harmful gas, the communication system comprising: a central server operable to receive information from a plurality of devices; one or more access points located throughout the facility, wherein the access points communicate wirelessly with other devices within the facility; at least three beacons located within the facility, wherein the beacons transmit location information; one or more detector devices located within the facility, wherein the detector device is operable to communicate with the beacons and the access points via wireless radio channels, and wherein the detector device comprises a single radio operable to switch between two or more radio channels, wherein a first channel is used by the detector device to receive location data information from the one or more beacons, wherein the detector device communicates with the beacon when the detector device is in the range for that specific beacon; and wherein a second channel is used by the detector device to communicate data to the central server via the one or more of the access points.

In some embodiments, the central server is connected to a user interface operable to display the information received from the plurality of devices. In some embodiments, the access points are located in fixed locations within the facility. In some embodiments, the access points communicate over a wired connection with other devices within the facility. In some embodiments, the at least three beacons are incorporated into at least three of the access points. In some embodiments, the detector device switches between the first and second channels using direct-sequence spread spectrum (DSSS). In some embodiments, the first channel is a default channel, and wherein the detector device spends a majority of the time receiving information from one or more beacons. In some embodiments, the data communicated from the detector device comprises gas sensor data, location data, identification data, time of use data, as well as any other data which is acquired by the detector device. In some embodiments, the location data comprises the data received by the detector device from the one or more beacons. In some embodiments, the location data comprises beacon ID, RSSI, TDOA, and AoA. In some embodiments, the central server receives the data from the detector device and analyzes and processes the data. In some embodiments, the central server uses the location information to perform a triangulation algorithm to determine the actual location of the detector device within the facility. In some embodiments, the data sent by the detector device to the central server is associated with a time stamp or time frame. In some embodiments, the central server is part of a central monitoring station.

Additional aspects of the disclosure may include embodiments of a communication system for use in a facility comprising hazardous or harmful gas, the communication system comprising: a central server operable to receive information from a plurality of devices; one or more access points located throughout the facility, wherein the access points communicate wirelessly with other devices within the facility; at least three beacons located within the facility, wherein the beacons transmit location information; one or more detector devices located within the facility, wherein the detector device is operable to communicate with the beacons and the access points via wireless radio channels, and wherein the detector device comprises a single radio operable to switch between two or more radio channels, wherein the detector device uses a first channel to receive location data information from the one or more beacons, wherein the detector device communicates with the beacon when the detector device is in the range for that specific beacon; the detector device uses a second channel to communicate data to the central server via the one or more of the access points; the detector device switches from the first channel to the second channel at a first pre-set time interval, and switches back to the first channel after a second pre-set time interval; the data communicated from the detector device comprises gas sensor data, location data, identification data, time of use data, as well as any other data which is acquired by the detector device.

In some embodiments, the system comprises a plurality of detector devices. In some embodiments, the detector devices comprise one of gas detector devices and location tag devices.

Other aspects of the disclosure may include embodiments of a method for communicating data from a detector device comprising a single radio to a central server, the method comprising: receiving, by the detector device, location data from one or more beacon over a first radio channel; switching, by the detector device, from the first radio channel to a second radio channel at a pre-set time interval; sending, by the detector device, data via the second radio channel to an access point, wherein the data is then sent to a central server; and switching, by the detector device, from the second radio channel to the first radio channel at a pre-set time interval.

In some embodiments, the method is repeated for the duration of the time the detector device is in operation. In some embodiments, the data sent by the detector device comprises gas sensor data, location data, identification data, time of use data, as well as any other data which is acquired by the detector device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1 illustrates a exemplary embodiment of a communications system.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure relate to systems and methods for isolating a base station beacon and gas reading transmission channel(s) based on a single radio wireless gas detection system. A gas detector may communicate on a first channel (e.g. a beacon channel) constantly listening to the base station beacon information. At a pre-defined interval (e.g. every 60 seconds), the gas detector radio may switch to a second channel (e.g. a data channel) to transmit gas reading data as well as the base station information, such as ID, RSSI, TDOA, AoA, etc., to a central server. Software on the server may complete a triangulation algorithm to determine the location of the gas detector, using information obtained by the detector from the beacons. Additionally, in an alarm situation, the gas detector radio may automatically switch to the second (data) channel to report the alarm to the central server. Switching between the data channel and the beacon channel can be programmed to happen more often if it is necessary depending on the alarm situation. In such system, an access point may have two radios, one for data transmission, and the other one for transmitting a location beacon. In this case, an access point can work as a base station as well. Also, a battery powered beacon cell can be easily mounted to necessary place for higher location accuracy. Additionally, the transmit power of the beacon cell may be adjustable according to location accuracy requirement.

Referring now to FIG. 1, a communication system 100 is shown. The communication system 100 may comprise a central server 120 (which may be part of a central monitoring station) operable to receive information from a plurality of devices. The central server 120 may also be connected to a user interface 122 operable to display the information received from the plurality of devices. In some embodiments, the system 100 may comprise a plurality of access points 104, which may be located throughout a facility 101 where gas detection may be necessary. In some embodiments, the access points 104 may be in fixed locations within the facility 101. In some embodiments, the access points 104 may communicate wirelessly with other devices within the facility 101, and the access points 104 may communicate with other access point though the wireless mesh network within the facility 101. In some embodiments, the access points 104 may communicate over a wired connection with other devices within the facility 101. In some embodiments, the access points 104 may comprise two radios: a first radio for communicating over a first channel (such as a location channel) and a second radio for communicating over a second channel (such as a data channel). In the embodiment of FIG. 1, with the facility 101 may be comprised of at least three beacons 102, wherein the beacons 102 may be located throughout the facility 101, and wherein the beacons 102 may transmit location information to one or more devices within the facility 101. In some embodiments, the at least three beacons 102 may be incorporated into at least three of the access points 104, wherein there would be no need for separate beacon device(s). In other words, the access points 104 may comprise the functionality of the beacons 102.

In some embodiments, the system 100 may comprise one or more detector devices 106 located within the facility 101. The detector devices 106 may comprise gas detector devices operable to detect concentrations of harmful gases in the air. These detector devices 106 may be mobile and carried with a worker in the facility. In some embodiments, the detector devices may comprise a location tag 107, which may simply communicate location information and no other data. In some embodiments, the gas detector devices 106 may be operable to trigger alarms when the detected gas concentration reaches a threshold.

The detector device 106 may be operable to communicate with the beacons 102 and the access points 104 via wireless radio channels. In an embodiment, the detector device 106 may comprise a single radio 126 that may be operable to switch between two or more radio channels. A first channel may be used by the detector device 106 to receive location data information from the one or more beacons 102, wherein the detector device 106 may communicate with a beacon 102 when the detector device 106 is in the range for that specific beacon 102. In some embodiments, the first channel may be considered a default channel, wherein the detector device 106 spends a majority of the time receiving information from one or more beacons 102. A second channel may be used by the detector device 106 to communicate data to the central server 120 via one or more of the access points 104. The data communicated from the detector device 106 may comprise gas sensor data, location data, identification data, time of use data, as well as any other data which may be acquired by the detector device 106. In some embodiments, the location data may comprise the data received by the detector device 106 from the one or more beacons 102, wherein the location data may comprise beacon ID, RSSI, TDOA, AoA, etc. In some embodiments, the data sent by the detector device 106 may be associated with a time stamp or time frame.

In some embodiments, the detector device 106 may be operable to switch from the first channel to the second channel at a first pre-set time interval, and switch back to the first channel after a second pre-set time interval. In some embodiments, the first pre-set time interval may be significantly longer than the second pre-set time interval. Additionally, the time intervals may be controlled by an algorithm or protocol for managing the communication of multiple detector devices 106, wherein each detector device 106 may switch to the second radio channel at separate times. In some embodiments, this may be accomplished using direct-sequence spread spectrum (DSSS), as defined by Institute of Electrical and Electronics Engineers (IEEE) 802.15.4, or another similar system or protocol, such as frequency-hopping spread spectrum (FHSS), frequency division multiple access (FDMA), and time division multiple access (TDMA).

In some embodiments, the central server 120 may receive the data from the detector device 106 and may analyze and/or process the data. For example, the central server 120 may use the location information to perform a triangulation algorithm to determine the actual location(s) of the detector device 106 within the facility 101. In this embodiment, the data may not be processed or analyzed locally by the detector device 106, but may instead be communicated to the central server 120 for analysis.

Some embodiments of the disclosure may comprise methods for communicating data from a detector device comprising a single radio 126 to a central server 120. The method may comprise receiving, by the detector device 106, location data from one or more beacon 102 over a first radio channel; switching, by the detector device 106, from the first radio channel to a second radio channel at a pre-set time interval; sending, by the detector device 106, data via the second radio channel to an access point, wherein the data is then sent to a central server 120; and switching, by the detector device 106, from the second radio channel to the first radio channel at a pre-set time interval. In some embodiments, the method may be repeated for the duration of the time the detector device 106 is in operation within the facility. In some embodiments, the data sent by the detector device 106 comprises gas sensor data, location data, identification data, time of use data, as well as any other data which is acquired by the detector device.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication system for use in a facility comprising hazardous or harmful gas, the communication system comprising:
   a central server configured to receive information from a plurality of devices;
   one or more access points located throughout the facility, wherein the access points communicate wirelessly with other devices within the facility;
   at least three beacons located within the facility, wherein the beacons transmit location information;
   one or more detector devices located within the facility, wherein the detector device is configured to communicate with the beacons and the access points via wireless radio channels, and wherein the detector device comprises a single radio configured to switch between two or more radio channels,
   wherein:
   a first channel is used by the detector device to receive location data information from the one or more beacons, wherein the detector device communicates with the beacon when the detector device is in the range for that specific beacon; and
   a second channel is used by the detector device to communicate data to the central server via the one or more of the access points.

2. The system of claim 1, wherein the central server is connected to a user interface configured to display the information received from the plurality of devices.

3. The system of claim 1, wherein the access points are located in fixed locations within the facility.

4. The system of claim 1, wherein the access points communicate over a wired connection with other devices within the facility.

5. The system of claim 1, wherein the at least three beacons are incorporated into at least three of the access points, and wherein the access point comprises a first radio for communicating over a first channel and a second radio for communicating over a second channel.

6. The system of claim 1, wherein the detector device switches between the first and second channels using direct-sequence spread spectrum (DSSS).

7. The system of claim 1, wherein the first channel is a default channel, and wherein the detector device spends a majority of the time receiving information from one or more beacons.

8. The system of claim 1, wherein the data communicated from the detector device comprises gas sensor data, location data, identification data, time of use data, as well as any other data which is acquired by the detector device.

9. The system of claim 8, wherein the location data comprises the data received by the detector device from the one or more beacons.

10. The system of claim 9, wherein the location data comprises beacon identification (ID), received signal strength indication (RSSI), time difference of arrival (TDOA), and angle of arrival (AoA).

11. The system of claim 8, wherein the central server is configured to: receive the data from the detector device, analyze the data, and process the data.

12. The system of claim 11, wherein the central server uses the location information to perform a triangulation algorithm to determine the actual location of the detector device within the facility.

13. The system of claim 1, wherein the data sent by the detector device to the central server is associated with a time stamp or time frame.

14. The system of claim 1, wherein the central server is part of a central monitoring station.

15. A communication System for use in a facility comprising hazardous or harmful gas, the communication system comprising:
   a central server configured to receive information from a plurality of devices;
   one or more access points located throughout the facility, wherein the access points communicate wirelessly with other devices within the facility;
   at least three beacons located within the facility, wherein the beacons transmit location information;
   one or more detector devices located within the facility, wherein the detector device is configured to communicate with the beacons and the access points via wireless radio channels, and wherein the detector device comprises a single radio configured to switch between two or more radio channels,
   wherein:
   the detector device uses a first channel to receive location data information from the one or more beacons, wherein the detector device communicates with the beacon when the detector device is in the range for that specific beacon;
   the detector device uses a second channel to communicate data to the central server via the one or more of the access points;
   the detector device switches from the first channel to the second channel at a first pre-set time interval, and switches back to the first channel after a second pre-set time interval;
   the data communicated from the detector device comprises gas sensor data, location data, identification data, time of use data, as well as any other data which is acquired by the detector device.

16. The system of claim 15, wherein the system comprises a plurality of detector devices.

17. The system of claim 15, wherein the detector devices comprise one of gas detector devices and location tag devices.

18. A method for communicating data from a detector device comprising a single radio to a central server, the method comprising:
   receiving, by the detector device, location data from one or more beacons over a first radio channel;
   switching, by the detector device, from the first radio channel to a second radio channel at a pre-set time interval;

sending, by the detector device, data via the second radio channel to an access point, wherein the data is then sent to a central server; and switching, by the detector device, from the second radio channel to the first radio channel at a pre-set time interval.

19. The method of claim 18, wherein the method is repeated for the duration of the time the detector device is in operation.

20. The method of claim 18, wherein the data sent by the detector device comprises gas sensor data, location data, identification data, time of use data, as well as any other data which is acquired by the detector device.

* * * * *

UNITED STATES PATENT AND TRADEMARK OFFICE
CERTIFICATE OF CORRECTION

PATENT NO. : 10,089,849 B2
APPLICATION NO. : 15/557766
DATED : October 2, 2018
INVENTOR(S) : James Liu et al.

Page 1 of 1

It is certified that error appears in the above-identified patent and that said Letters Patent is hereby corrected as shown below:

In the Claims

Column 8/Line 21 Claim 15:
"System" should be "system"

Signed and Sealed this
Fourth Day of December, 2018

Andrei Iancu
*Director of the United States Patent and Trademark Office*